United States Patent
Donovan et al.

(10) Patent No.: US 8,422,968 B2
(45) Date of Patent: Apr. 16, 2013

(54) WIRELESS ELECTRONIC DEVICE WITH OPEN-LOOP AND CLOSED-LOOP OUTPUT POWER CONTROL

(75) Inventors: David A. Donovan, Oakland, CA (US); Justin Gregg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 12/477,862

(22) Filed: Jun. 3, 2009

(65) Prior Publication Data
US 2010/0311474 A1 Dec. 9, 2010

(51) Int. Cl.
 *H01Q 11/12* (2006.01)
 *H04B 1/04* (2006.01)
 *H04M 1/00* (2006.01)

(52) U.S. Cl.
 USPC ............ 455/127.2; 455/126; 455/127.4; 455/114.3; 455/115.1; 455/553.1

(58) Field of Classification Search ......... 455/126, 455/127.1, 127.2, 114.3, 115.1, 115.3, 522
 See application file for complete search history.

(56) References Cited

U.S. PATENT DOCUMENTS

| | | | |
|---|---|---|---|
| 5,467,055 A | | 11/1995 | Wray |
| 5,603,106 A | * | 2/1997 | Toda .......................... 455/126 |
| 5,689,815 A | | 11/1997 | Yamazaki |
| 5,722,056 A | | 2/1998 | Horowitz |
| 6,070,058 A | | 5/2000 | Waldroup |
| 6,788,138 B2 | * | 9/2004 | Suzuki ......................... 330/129 |
| 7,110,727 B2 | * | 9/2006 | Dekker ........................... 455/91 |
| 7,209,717 B2 | * | 4/2007 | Okada et al. .................. 455/126 |
| 7,474,878 B1 | * | 1/2009 | Hietala et al. ................. 455/126 |
| 7,532,680 B2 | * | 5/2009 | Vayrynen et al. .............. 375/295 |
| 7,724,086 B2 | * | 5/2010 | Camuffo et al. ............... 330/129 |
| 7,805,116 B2 | * | 9/2010 | Xu et al. .................... 455/127.2 |
| 7,873,333 B2 | * | 1/2011 | Tanaka et al. ................. 455/126 |
| 7,925,227 B2 | * | 4/2011 | Ichitsubo ................... 455/114.1 |
| 7,962,108 B1 | * | 6/2011 | Khlat et al. ................. 455/114.3 |
| 7,991,367 B2 | * | 8/2011 | Pratt et al. .................. 455/114.3 |
| 2005/0227646 A1 | * | 10/2005 | Yamazaki et al. ......... 455/127.3 |
| 2008/0227477 A1 | * | 9/2008 | Dayal et al. .................. 455/522 |
| 2009/0298448 A1 | * | 12/2009 | Mayer et al. ............... 455/127.2 |
| 2010/0008410 A1 | * | 1/2010 | Shute et al. ................... 375/221 |
| 2010/0113105 A1 | * | 5/2010 | Xu et al. ...................... 455/572 |

* cited by examiner

*Primary Examiner* — Duc M Nguyen
(74) *Attorney, Agent, or Firm* — Treyz Law Group; G. Victor Treyz; Nancy Y. Ru (57) ABSTRACT

Wireless circuitry in an electronic device may contain radio-frequency transceiver circuitry and power amplifier circuitry that transmits radio-frequency signals through an antenna. A tap and power detector that are interposed in the radio-frequency signal path between the power amplifier circuitry and the antenna may be used to make output power measurements. Control circuitry may control the wireless circuitry in an open-loop control regime in which output power adjustments are based on a requested power without using the output power measurements. The control circuitry may also control the wireless circuitry in a closed-loop control regime in which the output power measurements serve as a source of real time feedback to determine whether to increase or decrease the output power. The output power may be controlled using linear transition zone power control curves in a transition zone between the open-loop regime and the closed-loop regime.

21 Claims, 10 Drawing Sheets

WIRELESS ELECTRONIC DEVICE WITH OPEN-LOOP AND CLOSED-LOOP OUTPUT POWER CONTROL

BACKGROUND

This invention relates generally to wireless communications circuitry, and more particularly, to wireless communications circuitry that controls radio-frequency output powers in electronic devices using closed-loop and open-loop control.

Handheld electronic devices and other portable electronic devices are becoming increasingly popular. Examples of handheld devices include handheld computers, cellular telephones, and media players. Popular portable electronic devices that are somewhat larger than traditional handheld electronic devices include laptop computers and tablet computers.

Due in part to their mobile nature, portable electronic devices are often provided with wireless communications capabilities. For example, portable electronic devices may use long-range wireless communications to communicate with wireless base stations. In particular, cellular telephones and other devices with cellular capabilities may communicate using cellular telephone bands at 850 MHz, 900 MHz, 1800 MHz, and 1900 MHz. Communications are also possible in the 2100 MHz communications band.

During operation, the quality of the wireless link between a portable electronic device and a wireless base station may vary. For example, link quality may decrease when the wireless link is blocked by an obstruction or when the distance between the portable electronic device and wireless base station increases due to device movement. Link quality may increase when the portable electronic device is moved to an unobstructed location or when the distance between the portable electronic device and the base station is reduced.

Because link quality can vary, real-time output power adjustments are typically made during device operation. When wireless link quality is high, radio-frequency signals may be transmitted from the portable electronic device at a relatively low output power. This helps to conserve power and avoids interference with other devices in the network. When wireless link quality is low, radio-frequency transmit powers can be increased to ensure that radio-frequency signals are received satisfactorily at the wireless base station. The wireless base station can send commands to portable devices that inform the devices of necessary power adjustments. These commands, which are sometimes referred to as transmit power control (TPC) commands, can instruct a given device to increase or decrease its radio-frequency output as appropriate.

Successful operation of a portable electronic device generally requires that the device be capable of receiving and processing transmit power control commands from network equipment. When a command is received to increase the output power, control signals are used to adjust internal wireless circuitry to make a corresponding upward adjustment to the power of the transmitted radio-frequency signals. When a command is received that indicates that less output power is needed, the device can respond by instructing the wireless circuitry to decrease the output signal strength.

To ensure that the output powers that are provided are correct, calibration operations may be performed on portable electronic devices. Closed-loop (feedback) control techniques can also be used to ensure accurate output power control. Closed-loop techniques typically rely on power detector measurements that are only accurate near the upper range of commonly used output powers. As a result, it may be desirable to revert to an open-loop control scheme at low powers. Satisfactory transitions between open-loop and closed-loop control regimes can be difficult to achieve, however, because open-loop control schemes are more frequency dependent than closed-loop schemes. This gives rise to a potential for significant output power inaccuracies.

It would therefore be desirable to be able to provide improved radio-frequency output power control in wireless electronic devices.

SUMMARY

An electronic device such as a cellular telephone or other portable electronic device is provided with wireless communications circuitry. The wireless communications circuitry may include radio-frequency transceiver circuitry and power amplifier circuitry. The wireless communications circuitry may include an antenna through which the radio-frequency transceiver circuitry and power amplifier circuitry transmit radio-frequency signals.

During operation of the portable electronic device, it may be desirable to adjust the output power of the radio-frequency signals to accommodate changes in the operating environment for the device and to respond to commands received from network equipment. If, for example, the network equipment issues a command that directs the portable electronic device to increase its output power, the control circuitry can direct the radio-frequency transceiver circuitry and power amplifier circuitry to make an appropriate increase to its signal strength. Signal strength reductions can also be made.

At high powers a closed-loop control scheme may be used in which real-time power measurements from a power detector serve as feedback to ensure that the output power that is produced accurately matches requested power levels. At low output powers the power detector may not be as accurate as at high powers, so it may desirable to transition to an open-loop control scheme in which the control circuitry controls the output power based on requested powers without using real time feedback.

To ensure smooth transitions between the open-loop and closed-loop control regimes, the control circuitry may smoothly transition the output power from the value produced using the open-loop scheme to the value produced using the closed-loop scheme. In the transition zone, the control circuitry may modify open-loop powers using a measurement of the output power or may use a modified closed-loop control scheme in which power measurements are used as feedback, but the requested power level is modified from its nominal value using known power offset information. Information on the known width of the transition zone may be used in both modified open-loop and modified closed-loop transition zone configurations.

Further features of the invention, its nature and various advantages will be more apparent from the accompanying drawings and the following detailed description of the preferred embodiments.

DETAILED DESCRIPTION

This relates generally to wireless communications, and more particularly, to radio-frequency output power control in wireless communications circuitry in wireless electronic devices.

The wireless electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

The wireless electronic devices may be, for example, cellular telephones, media players with wireless communications capabilities, handheld computers (also sometimes called personal digital assistants), remote controllers, global positioning system (GPS) devices, and handheld gaming devices. Wireless electronic devices such as these may perform multiple functions. For example, a cellular telephone may include media player functionality and may have the ability to run games, email applications, web browsing applications, and other software.

Figure 1:
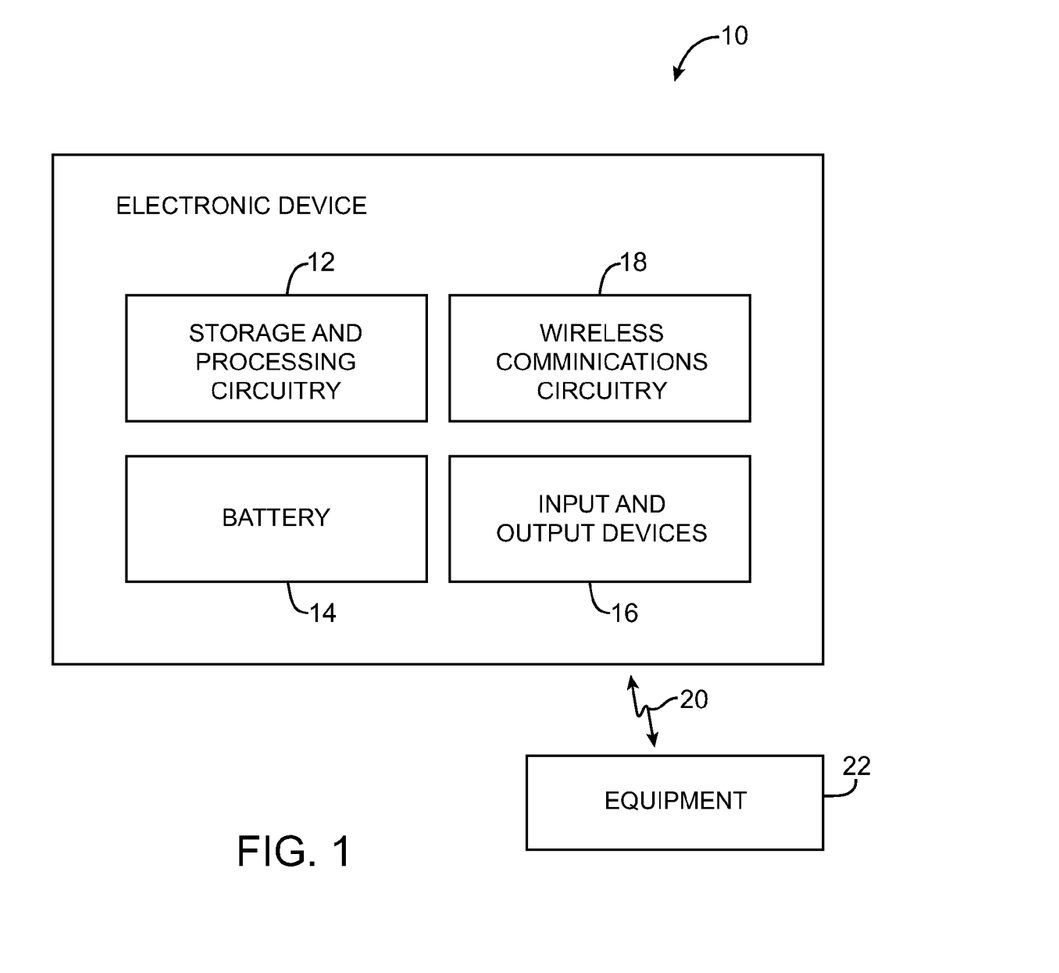
FIG. 1 is a schematic diagram of an illustrative electronic device with wireless communications circuitry in accordance with an embodiment of the present invention.

A diagram of an illustrative electronic device such as a handheld electronic device or other portable electronic device is shown in FIG. 1. Device 10 of FIG. 1 may be a mobile telephone, a mobile telephone with media player capabilities, a handheld computer, a remote control, a game player, a global positioning system (GPS) device, a laptop computer, a tablet computer, an ultraportable computer, a device with the capacity to perform the functions of one or more of such devices, or any other suitable portable electronic device.

As shown in FIG. 1, device 10 may include storage and processing circuitry 12. Storage and processing circuitry 12 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 12 may be used in controlling the operation of device 10. Processing circuitry in circuitry 12 may be based on processors such as microprocessors, microcontrollers, digital signal processors, dedicated processing circuits, power management circuits, audio and video chips, radio-frequency transceiver processing circuits, radio-frequency integrated circuits of the type that are sometimes referred to as baseband modules, and other suitable integrated circuits.

With one suitable arrangement, storage and processing circuitry 12 may be used to run software on device 10, such as internet browsing applications, voice-over-internet-protocol (VOIP) telephone call applications, email applications, media playback applications, operating system functions, control processes for controlling wireless output powers and other wireless functions, etc. Storage and processing circuitry 12 may be used in implementing suitable communications protocols. Communications protocols that may be implemented using storage and processing circuitry 12 include internet protocols, wireless local area network protocols (e.g., IEEE 802.11 protocols—sometimes referred to as Wi-Fi®), protocols for other short-range wireless communications links such as the Bluetooth® protocol, protocols for handling 2G, 3G, and 4G cellular telephone communications services, communications protocols such as high-speed uplink packet access (HSUPA) protocols, etc.

Device 10 may have one or more batteries such as battery 14. To minimize power consumption and thereby extend the life of battery 14, storage and processing circuitry 12 may be used in implementing power management functions for device 10. For example, storage and processing circuitry 12 may be used to adjust radio-frequency power amplifier circuitry on device 10 and may be used in adjusting input power levels provided to the input of radio-frequency power amplifier circuitry on device 10 from a transceiver circuit. Power amplifier adjustments that may be made include gain setting adjustments (e.g., to selectively turn on and off gain stages) and power supply voltage adjustments (also sometimes referred to as bias voltage adjustments). These adjustments may be made automatically in real time using closed-loop and open-loop control techniques.

Control algorithms that are implemented on storage and processing circuitry 12 may be used in controlling the operation of device 10. For example, a desired power amplifier bias voltage may be determined by a control algorithm in real time based on criteria such as requested output power. Device 10 may be instructed to produce a particular output power by a wireless base station or other network equipment. In some modes of operation, device 10 may monitor the current output power using a radio-frequency tap and associated power detector. Information such as the current output power, current control mode for device 10, current requested output power (i.e., the current power setting), information on any desired amount of increase or decrease in output power from network equipment, and other suitable information may be used by processing circuitry 12 in controlling the power level for the radio-frequency signals transmitted by device 10. Code may be stored in storage and processing circuitry 12 that configures storage and processing circuitry 12 to implement a wireless transmit power control algorithm for device 10. Among other functions, the code may help to operate device 10 in appropriate control modes at various output power levels (i.e., a closed-loop mode, an open-loop mode, a mode in which modified closed-loop and/or open-loop techniques are used, etc.).

Input-output devices 16 may be used to allow data to be supplied to device 10 and to allow data to be provided from device 10 to external devices. Examples of input-output devices 16 that may be used in device 10 include display screens such as touch screens (e.g., liquid crystal displays or organic light-emitting diode displays), buttons, joysticks, click wheels, scrolling wheels, touch pads, key pads, keyboards, microphones, speakers and other devices for creating sound, cameras, sensors, etc. A user can control the operation of device 10 by supplying commands through devices 16. Devices 16 may also be used to convey visual or sonic information to the user of device 10. Devices 16 may include connectors for forming data ports (e.g., for attaching external equipment such as computers, accessories, etc.).

Wireless communications devices 18 may include communications circuitry such as radio-frequency (RF) transceiver circuitry formed from one or more integrated circuits (e.g., circuitry that is controlled by control signals from storage and processing circuitry 14), power amplifier circuitry (e.g., power amplifier circuitry that is controlled by control signals from storage and processing circuitry 14), passive RF components, antennas, and other circuitry for handling RF wireless signals. Wireless signals can also be sent using light (e.g., using infrared communications).

Device 10 can communicate with external devices such as accessories, computing equipment, and wireless networks over wired and wireless communications paths. These external devices are shown as equipment 22 in FIG. 1. Link 20 between device 10 and equipment 22 may include wired and wireless links. In a typical scenario, device 10 communicates using at least some wireless links such as cellular telephone links.

Equipment 22 may include accessories. For example, accessories such as wired or wireless headsets may communicate with device 10. Device 10 may also be connected to audio-video equipment (e.g., wireless speakers, a game controller, or other equipment that receives and plays audio and video content) or a peripheral such as a wireless printer or camera.

Device 10 may use a wired or wireless path to communicate with a personal computer or other computing equipment. The computing equipment may be, for example, a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Device 10 can also communicate with wireless network equipment such as cellular telephone base stations, wireless data networks, computers associated with wireless networks, etc. This type of equipment is also depicted as equipment 22 in FIG. 1.

Wireless networks may include network management equipment that monitors the wireless signal strength of the wireless handsets such as device 10 that are in communication with the network. To improve the overall performance of the network and to ensure that interference between handsets is minimized, the network management equipment may send power adjustment commands (sometimes referred to as transmit power control commands or TCP commands) to each handset. The transmit power control settings that are provided to the handsets direct handsets with weak signals to increase their transmit powers, so that their signals will be properly received by the network. At the same time, the transmit power control settings may instruct handsets whose signals are being received clearly at high power to reduce their transmit power control settings. This reduces interference between handsets and allows the network to maximize its use of available wireless bandwidth.

When device 10 receives transmit power control commands from the network or at other suitable times, device 10 may make suitable transmission power adjustments. For example, device 10 may adjust the power level of signals that are provided by transceiver circuitry to radio-frequency power amplifiers on device 10 and may adjust the radio-frequency power amplifiers. Power amplifier adjustments may include gain mode settings adjustments and power supply voltage adjustments. Output power changes that are made using power amplifier circuitry and/or transceiver circuitry on device 10 are sometimes referred to as wireless output power adjustments or transmit power adjustments.

The output signals from the wireless circuitry on device 10 are wirelessly transmitted from device 10 to suitable receivers using antennas in devices 10.

Figure 2:
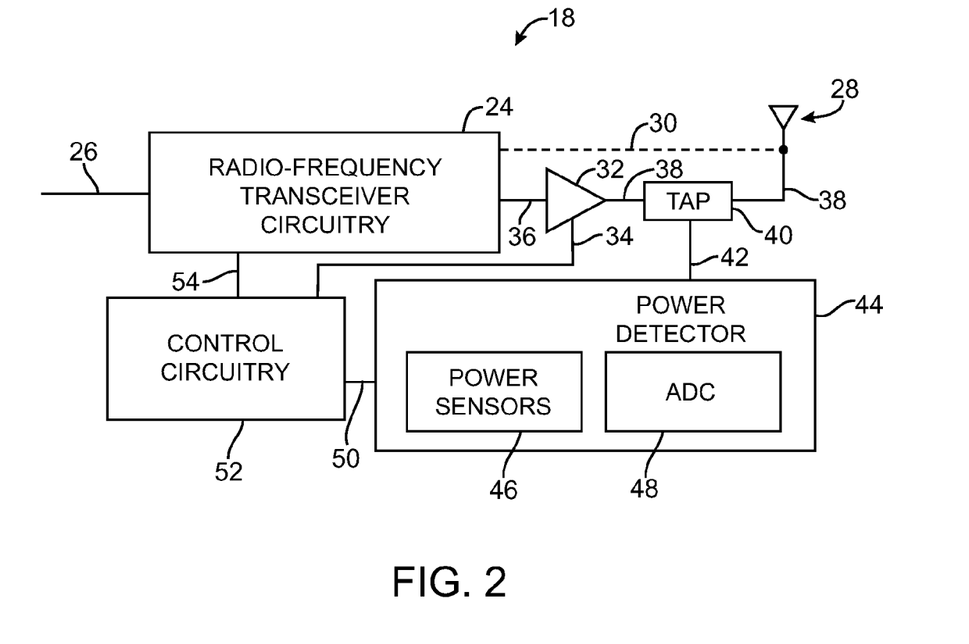
FIG. 2 is a circuit diagram of illustrative wireless communications circuitry in accordance with an embodiment of the present invention.

Illustrative wireless communications circuitry 18 that may be used in device 10 is shown in FIG. 2. As shown in FIG. 2, wireless communications circuitry 18 may include antenna structures such as antenna structures 28 (i.e., one or more antennas). Antenna structures 28 and associated wireless communications devices in wireless communications circuitry 18 may support communications over any suitable wireless communications bands. For example, wireless communications circuitry 18 may be used to cover communications frequency bands such as cellular telephone voice and data bands at 850 MHz, 900 MHz, 1800 MHz, 1900 MHz, and the communications band at 2100 MHz band, the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1550 MHz.

Device 10 can cover these communications bands and other suitable communications bands with proper configuration of antenna structures 28. Any suitable antennas may be used in antenna structures 28 and device 10. For example, antenna structures 28 may include one antenna or may include multiple antennas. The antennas may each be used to cover a single communications band or each antenna may cover multiple communications bands. If desired, one or more antennas may cover a single band while one or more additional antennas are each used to cover multiple bands.

Wireless communications circuitry 18 may include radio-frequency input-output circuits such as radio-frequency transceiver 24 and radio-frequency power amplifier 32. Control circuitry 52, which may be considered to be part of storage and processing circuitry 12 of FIG. 1, may be used to control radio-frequency transceiver 24 and power amplifier circuitry 32.

Radio-frequency transceiver circuitry 24 may have an input-output port 26. During signal transmission operations, storage and processing circuitry 12 (FIG. 1) may supply radio-frequency signals at that are to be transmitted by antenna structure 28 to port 26. Dashed line 30 indicates how received radio-frequency signals from antenna structures 28 may be provided to radio-frequency transceiver circuitry 24. During signal reception operations, radio-frequency transceiver circuitry 24 may use port 26 to provide circuitry 12 (FIG. 1) with data that has been received by antenna structures 28.

Data signals that are to be transmitted by device 10 may be provided to a baseband module in circuitry 24 (e.g., from storage and processing circuitry 12 of FIG. 1). The baseband module may be implemented using a single integrated circuit (e.g., a baseband processor integrated circuit) or using multiple circuits. The baseband module may receive signals to be transmitted over antenna structures 28 at port 26 (e.g., from storage and processing circuitry 12). The baseband module may provide signals that are to be transmitted to transmitter circuitry within RF transceiver circuitry 24. The transmitter circuitry may be coupled to power amplifier circuitry 32 via path 36. Control circuitry 52 may control the baseband module and transmitter in circuitry 24 using control path 54. Control path 34 may be used to provide control signals to power amplifier circuitry 32.

The control signals that are provided to radio-frequency transceiver circuitry 24 and power amplifier circuitry 32 may be analog or digital signals (e.g., power supply signals, gain control level settings, on/off commands, digital power level settings, etc.). The control signals that are supplied over path 54 may be used to control the power of the radio-frequency signals that the transmitter circuitry within transceiver circuitry 24 supplies to the input of power amplifier circuitry 32 over path 36. This transmitted radio-frequency signal power level is sometimes referred to an "input power" because it represents the input power to power amplifier circuitry 32. The control signals that are supplied to power amplifier circuitry 32 can be used to control the gain of amplifier circuitry 32. By controlling circuitry 24 and/or circuitry 32, control circuitry 52 can adjust the power of transmitted radio-frequency signals on path 38 and the corresponding wireless signals that are transmitted through antenna structures 28 (both of which are sometimes referred to as the transmitted power or output power for device 10).

A radio-frequency tap such as tap 40 may be interposed in output path 38. Tap 40 may tap a fraction of the radio-frequency power (e.g., 0.1% to 10%) on path 38. For example, if the power on path 38 is 10 mW, the tapped power on path 42 may be 1% of 10 mW (i.e., 0.1 mW). The tapped power is proportional to the radio-frequency output power for device 10 and can therefore be measured to determine the current output power level.

Path 42 may be used to route the tapped radio-frequency signal from tap 40 to power detector 44. Power detector 44 may include a power sensor such as power sensor 46 and an analog-to-digital converter (ADC) such as analog-to-digital converter 48. Power sensor 46 can convert the tapped radio-frequency signal on path 42 into an analog signal that is proportional to the power of the tapped radio-frequency signal. Analog-to-digital converter 48 can convert the analog signal that is produced by power sensor 46 into a corresponding digital value. This digital value is proportional to the output power Pout of device 10 and can be provided to control circuitry 52 using path 50. Control circuitry 52 may, if desired, use these real-time measurements of Pout in determining how to adjust the output power level Pout.

There are typically regulatory limits on the amount of emitted radio-frequency radiation that devices such as cellular telephones should emit in the vicinity of a user's body. It is therefore generally desirable to accurately control output power levels to ensure regulatory compliance. If output power levels are not controlled with sufficient accuracy, it may be necessary to be unnecessarily conservative in estimating the amount of output power that will be produced. Overly conservative designs will satisfy regulatory limits, but only at the expense of poor performance due to overly weak output powers.

Using a control scheme of the type shown in FIG. 2, radio-frequency output power levels can be accurately monitored. In particular, the amount of actual output power Pout that is being transmitted by device 10 can be measured in real time using power detector 44. This measured power can be used by control circuitry 52 to accurately control the amount of output power that is produced by wireless circuitry 18. If the power on path 38 starts to rise above a desired level, corrective control signals can be generated by control circuitry 52. In response to these control signals, the power that is produced by circuitry 18 on path 38 can be reduced to its desired level. Similarly, if the output power for device 10 begins to fall below a desired output power level, corrective control signals can be generated to produce an appropriate corrective increase in the output power.

Detector 44 can measure the power on path 38 in real time (e.g., once per millisecond or once per microsecond as examples). These measurements may be processed in real time by circuitry 52 and corresponding output power adjustments may be made as needed.

Schemes such as these in which output power measurements are used to adjust the output power of wireless circuitry 18 and device 10 in real time are sometimes referred to as closed-loop control schemes. Closed-loop control schemes (which are sometimes referred to as feedback schemes) can respond quickly and accurately to output power variations that might arise due to changes in the operating temperature of device 10 or other such factors.

Because closed-loop schemes tend to be highly accurate, it may be desirable to control the output power of wireless circuitry 18 using a closed-loop control scheme, particularly when operating device 10 at its highest output powers. This type of approach may help to guarantee that regulatory limits on maximum emitted power are not exceeded. When a closed-loop control scheme is used to control the output power, it is generally not necessary to be overly conservative in controlling the output power. Accurate real-time output power measurements can be made, ensuring that output powers do not become larger than desired, even when TPC commands are received from network equipment that request an increase in output power and even when temperatures and other operating conditions fluctuate.

A typical maximum output power for device 10 might be 24 dBm (as an example). During normal operation, the desired output power for device 10 may vary considerably depending on changes to the operating environment of device 10. For example, it may sometimes be desirable to reduce the output power to −56 dBm. Although closed-loop control schemes may be helpful in satisfying upper limits on output power (e.g., a 24 dBm limit), it can be difficult to implement closed-loop control schemes at low output power levels. At low power levels (e.g., when the power on path 38 is below about 6 dBm), it can become difficult to make accurate power measurements with the power detector.

To ensure satisfactory power control operations at low powers, it may be desirable to transition to open-loop control schemes at low output powers. In an open-loop control scheme, the amount of power that is transmitted over path 38 and the output power for device 10 is controlled based on the known characteristics of wireless circuitry 18 (e.g., the known amount of power that is produced by transceiver circuitry 24 and power amplifier 32 as a function of various control settings). Look-up tables and other data structures may be used to store information on known relationships between output power and control settings.

In environments in which open-loop control schemes are used to control circuitry 18 when producing low output powers and closed-loop control schemes are used to control circuitry 18 when producing high output powers, there is a need to transition effectively between the low power and high power control regimes. Unless care is taken, abrupt (non-monotonic and non-linear) changes to the output power and other undesirable fluctuations in transmitted signal strength may be produced. This type of poorly controlled output power may result in unacceptable wireless performance. For example, a device with an inadequately controlled transition between open-loop and closed-loop control regimes may drop calls or fail to maintain data links as expected.

Device 10 can control the radio-frequency output power produced by wireless communications circuitry 18 and device 10 so as to ensure a satisfactory transition between open-loop and closed-loop control techniques. At low powers (e.g., from about −56 dBm to roughly 6 dBm of output power), open-loop control can be used. At high powers (e.g., from roughly 6 dBm to about 24 dBm of output power), closed-loop control can be used. At intermediate powers (e.g., at powers in the range of a few dBm above or below 6 dBm in this example), there may be a transition zone in which the output power is adjusted to smoothly transition between operating regimes. The smooth transition may be implemented, for example, using monotonic output power control curves such as linear or nearly linear output power curves in the transition zone. These transition zone output power curves may have values at the upper and lower boundaries of the transition zone that are equal to the values of the corresponding open-loop and closed-loop curves at these boundaries, thereby ensuring that there are no undesirable discontinuities in the output power when transitioning between different operating points.

During normal operating of device 10, the output power that is being produced will change as a function of time. For example, increases in power may result when TPC commands are received from the network that direct device 10 to increase the output power to strengthen a weak signal. By properly controlling the behavior of the output power that is produced in the transition zone, undesirable service disruptions may be avoided when transitioning between open-loop and closed-loop control.

With closed-loop schemes, real time measurements are made of the output power produced on path 38. This allows for automatic correction of systematic errors that might arise when using open-loop schemes. For example, errors that might arise from changes in operating temperature or changes in operating frequency can be avoided.

With open-loop schemes, there is a potential for the actual output power on path 38 to deviate somewhat from the desired output power. As an example, if changes in temperature cause the power amplifier circuitry to become more efficient than expected, the output power may be somewhat larger than expected. As another example, the efficiency of the power amplifier circuitry may vary as a function of operating frequency. This type of behavior is illustrated in the graph of FIG. 3.

Figure 3:
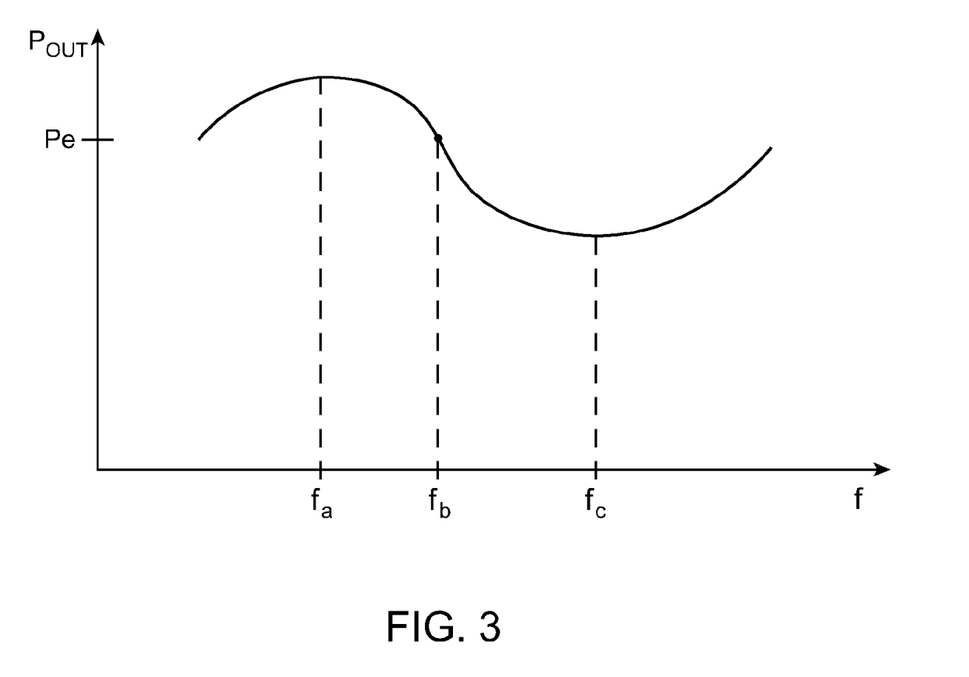
FIG. 3 is a graph showing how radio-frequency output power may vary as a function of operating frequency during certain modes of operation of a wireless electronic device in accordance with an embodiment of the present invention.

In the graph of FIG. 3, output power Pout is plotted as a function of frequency f. The frequency of radio-frequency output signals that are transmitted by device 10 varies depending on which channel is being used in a particular communications band. In the FIG. 3 example, the expected output power for a given communications band is Pe. This output power level is achieved when operating the wireless circuitry in the communications channel associated with frequency fb. However, due to the inherent characteristics of the radio-frequency transceiver circuitry and power amplifier circuitry, the output power Pout is higher than Pe when signals are transmitted in the channel associated with frequency fa and is lower than Pe when signals are transmitted in the channel associated with frequency fc.

At high output powers, when operating in the closed-loop control regime, the feedback provided from power detector 44 compensates for these inherent inaccuracies. However, at low output powers, when operating in the open-loop control regime, inaccuracies may result. For example, if the device has wireless circuitry with a frequency-dependent output power characteristic of the type shown in FIG. 3, the output power produced using the open-loop scheme may be higher than desired when operating at frequency fa and lower than desired when operating at frequency fc. When operating at frequency fb, the output power that is computed using the open-loop scheme will match the expected output power.

Any suitable control scheme may be used in the transition zone to avoid undesirable output power fluctuations when transitioning between different output power levels. For example, the transition zone may use a modified closed loop control scheme, a modified open-loop control scheme, or may involve the use of both closed-loop and open-loop control techniques. Transition zone output power control curves may be straight lines, linear segments with curved transitional end regions, other monotonic curve shapes, or other smooth curves.

An illustrative control arrangement in which the output power control in the transition zone is implemented using modified closed-loop techniques is described in connection with FIG. 4.

Figure 4:
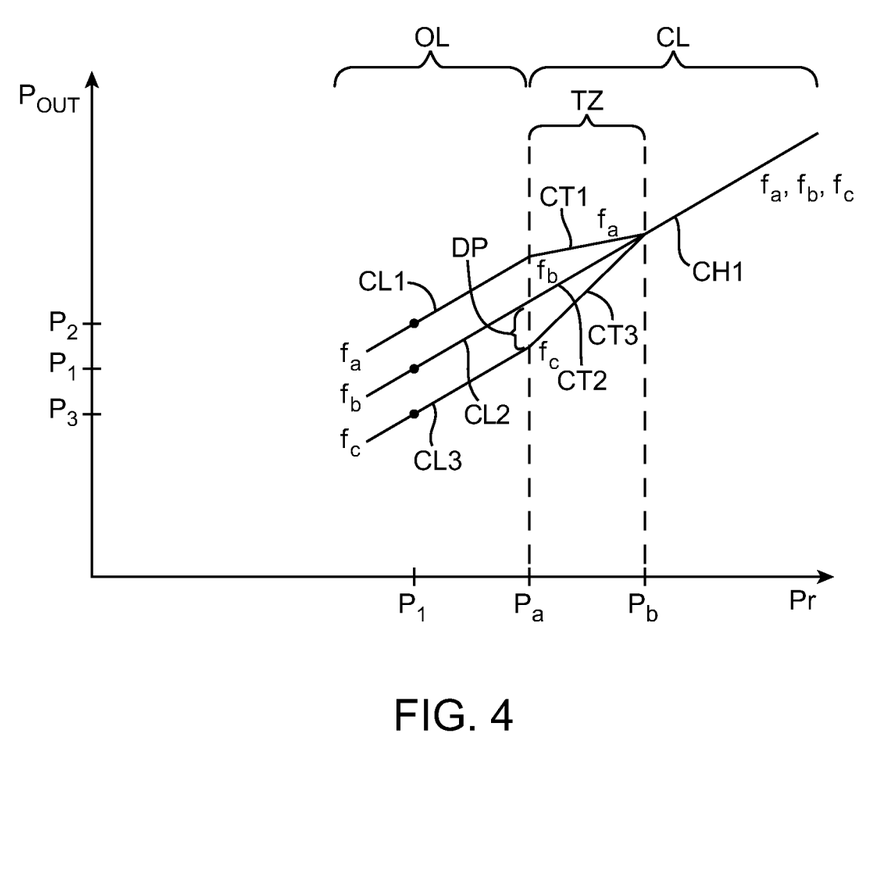
FIG. 4 is a graph showing illustrative radio-frequency output power control curves including linear transition zone curve segments for wireless circuitry in a portable electronic device in accordance with an embodiment of the present invention.

FIG. 4 is a graph of radio-frequency output power Pout from device 10 as a function of requested power level Pr. As shown in FIG. 4, control may be divided into an open loop regime OL at low powers and a closed loop regime CL at high powers. In the arrangement of FIG. 4, transition zone TZ is associated with closed loop regime CL.

In open-loop regime OL, the frequency-dependent behavior of the transceiver and power amplifier circuitry can lead to a situation in which the output power Pout that is produced by device 10 falls above or below the expected output power. Consider, as an example, a situation in which the desired output power is P1 (e.g., −30 dBm). Control circuitry 52 may use a look-up table or other suitable control scheme to determine the appropriate settings for transceiver circuitry 24 and 32 to achieve this desired output power. If device 10 is operating at frequency fb, the output power Pout may match the requested power P1. If, however, device is operating at frequency fa or fc, inaccuracies may arise due to the frequency-dependent behavior described in connection with FIG. 3. For example, if operating at frequency fa, an actual output power of P2 may be produced and if operating at frequency fc, an actual output power of P3 may be produced.

At high output powers, such as those associated when operating at the upper end of closed-loop regime CL, the output power Pout will match the requested output power Pr regardless of operating frequency. This is because feedback from power detector 44 compensates for temperature and frequency variations in wireless transmitter circuitry performance. As indicated in FIG. 4, this results in a single value for Pout for each requested value of Pr in the upper end of regime CL.

In transition zone TZ, control circuitry 52 can control the power produced by wireless circuitry 18 to smoothly transition between the single output power curve associated with high Pr values and the multiple output power curves associated with low output power values. The smooth transitions of the example of FIG. 4 are implemented using linear output power control curves in transition zone TZ.

Transition zone TZ may be located at any suitable portion of the output power range that is supported by device 10. As an example, if device 10 transmits radio-frequency signals with output powers of −56 dBm to 24 dBm, lower transition zone boundary Pa may be about 6 dBm (or other suitable value of about −1 dBm to 10 dBm) and upper transition zone boundary Pb may be about 8 dBm (or other suitable value of about 1 dBm to 12 dBm). In this type of configuration, transition zone TZ will span an output power range of about 2 dBm. Other configurations may be used if desired. For example, larger or smaller transition zone sizes may be used and the locations of the upper and lower transition zone boundaries may be different.

At higher output powers, such as powers above power Pb, there is a single output power curve (curve CH1 of FIG. 4). In this regime, feedback is used to ensure that the output power Pout matches the requested power Pr. In transition zone TZ, there are multiple output power curves such as output power curves CT1, CT2, and CT3. When operating in zone TZ, control circuitry 52 is continually receiving signals from the power detector that reflect the value of the current output power. At the same time, control circuitry 52 maintains information on the current requested power value (i.e., the value of Pr in FIG. 4). Based on this information and information on the known range of zone TZ (i.e., the value Pb-Pa, which may be stored by circuitry 52), control circuitry 52 can adjust transceiver circuitry 24 and power amplifier circuitry 32 so that the output power Pout falls on the appropriate control line.

Consider, as an example, a situation in which wireless circuitry 18 is operating at frequency fc. When operated at a power of Pa (or just below Pa) in open-loop regime OL, the value of Pout will be less than the requested value (i.e., Pout will be less than Pa). The difference between the actual Pout value and the requested value is depicted as offset power DP in FIG. 4. Because DP is known by circuitry 52, device 10 knows that wireless circuitry 18 is operating along control line CL3 in the OL regime and therefore should operate along corresponding curve CT3 in zone TZ. Rather than immediately switch device 10 from pure open-loop control to pure closed-loop control, device 10 can operate in a hybrid mode in zone TZ, so that the output power Pout follows curve CT3 (in this example).

It is not necessary for device 10 to operate at power Pa to determine that amount of power offset that exists between the open-loop control curves such as curves CL1, CL2, and CL3 and the closed-loop line CH1 (i.e., line CT2 in zone TZ). Offset information can be computed at any suitable operating point in regime CL based on the control settings and other information stored by circuitry 54 and based on measured powers from detector 44. Device 10 will therefore be able to compute the shape of the appropriate transition curve to use in zone TZ based on the current readings from power detector 44, the known width of zone TZ, and the requested power setting Pr, regardless of the current operating point.

Figure 5:
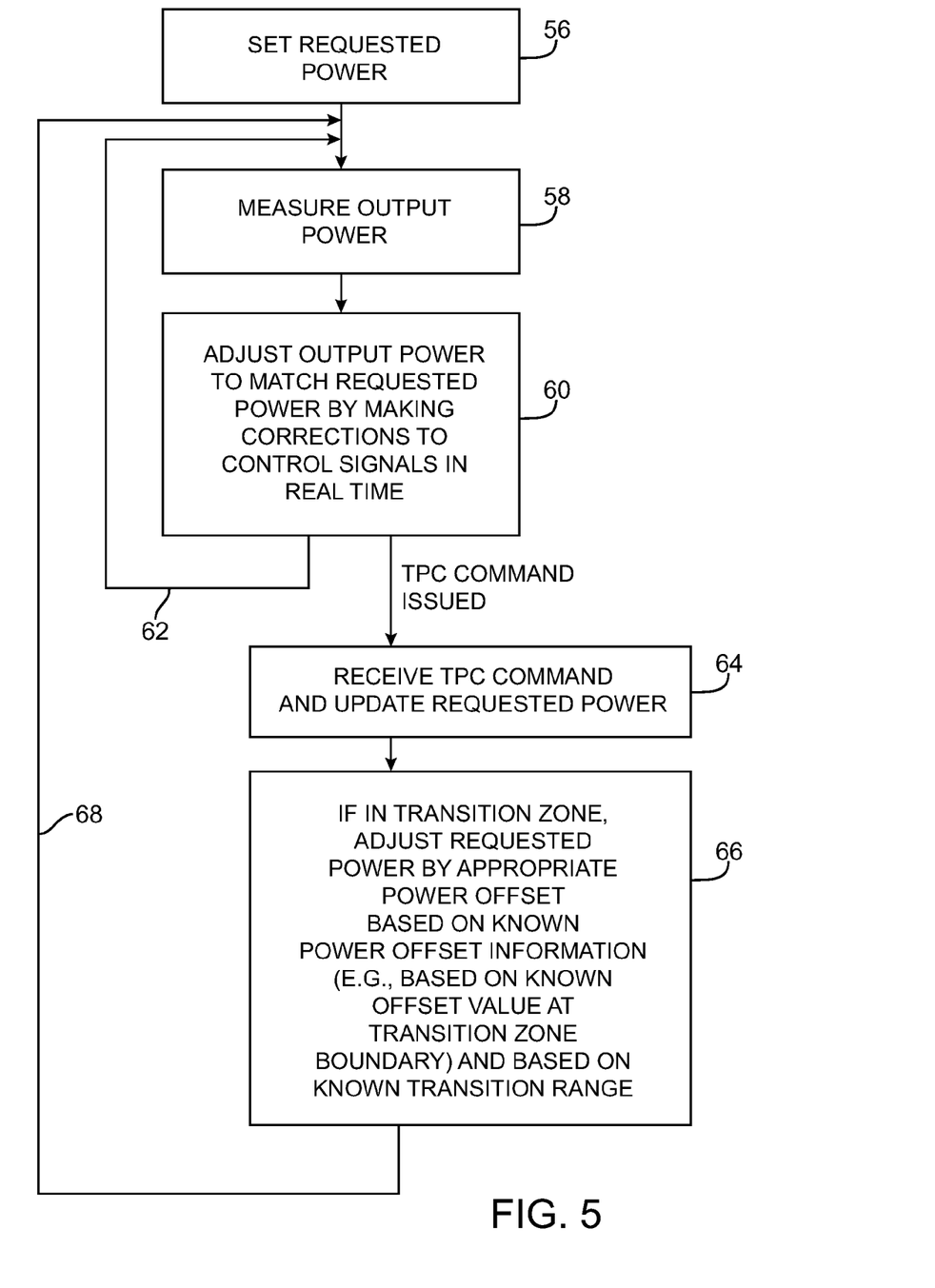
FIG. 5 is a flow chart of illustrative steps that may be used in implementing a radio-frequency output power control scheme of the type shown in FIG. 4 during closed-loop operations in accordance with an embodiment of the present invention.
Figure 6:
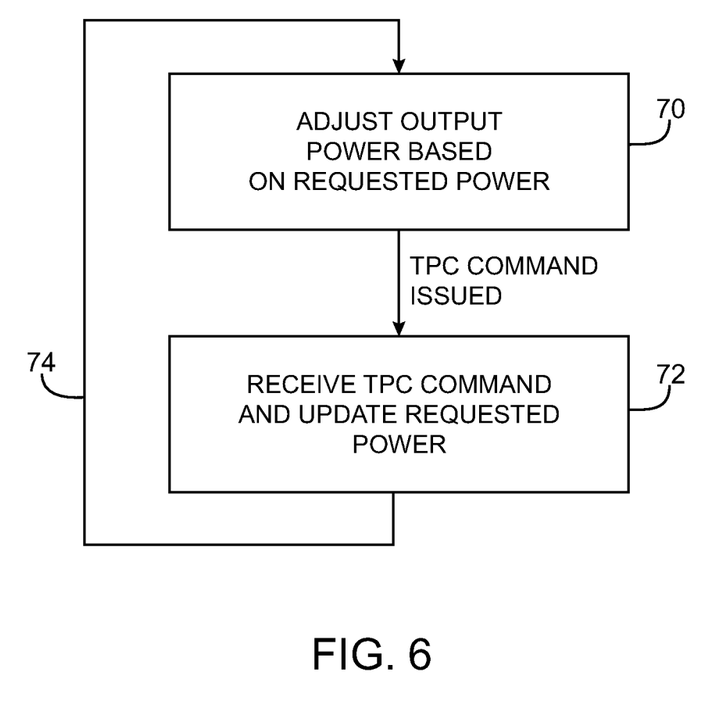
FIG. 6 is a flow chart of illustrative steps that may be used in implementing a radio-frequency output power control scheme of the type shown in FIG. 4 during open-loop operations in accordance with an embodiment of the present invention.

Illustrative steps that may be used in implementing this type of control scheme for device 10 are shown in FIGS. 5 and 6. Illustrative steps involved in operating device 10 in the closed-loop regime CL of FIG. 4 are shown in FIG. 5, whereas illustrative steps involved in operating device 10 in the open-loop regime OL of FIG. 4 are shown in FIG. 6.

At step 56 of FIG. 5, a requested power may be set in device 10. For example, a default transmit power of 24 dBm may be used when device 10 is first powered (as an example). Once the requested power level Pr is known, device 10 can activate power detector 44 and can begin to transmit radio-frequency signals over path 38 and antenna structure 28.

Power detector 44 monitors the power Pout using the tap that is interposed in path 38 at step 58.

If the measured power is lower than the requested power, control circuitry 52 can direct wireless circuitry 18 (i.e., transceiver circuitry 24 and/or power amplifier circuitry 32) to supply a larger amount of output power by making adjustments to the control signals on paths 54 and 36 at step 60. If the measured power is higher than the requested power, wireless circuitry 18 may be directed to reduce the strength of its output by adjusting the control signals on paths 54 and 36 at step 60. By using this type of feedback scheme, the output power can be adjusted to match the requested power, as illustrated by output power curve segment CH1 in FIG. 4.

As indicated by line 62, these operations can be performed continuously to ensure that the output power matches the requested power even in view of potential changes in the operating conditions for device 10 (e.g., changes in the environmental temperature, changes in the radio-frequency channel being used, etc.). The rate at which device 10 cycles through the control loop represented by line 62 can be relatively fast (e.g., once per 1-10 clock cycles). The loop period for loop 62 may be about 0.1 microsecond to 1 millisecond, as an example.

When a user moves device 10 or when device 10 becomes blocked by an obstruction, the radio-frequency signal output power may need to be adjusted. In a typical scenario, network equipment 22 (FIG. 1) may issue a TPC command that directs device 10 to increase or decrease its output power as needed to ensure that the quality of wireless link 20 is properly maintained. If a TPC command is issued by network equipment 22, device 10 may receive the TPC command at step 64. During the operations of step 64, device 10 can update the requested power value Pr. If, for example, the current value of Pr is 20 dBm and the TPC command asks device 10 to decrease its output power by 1 dBm, device 10 can lower the value of Pr to 19 dBm. Once control returns to steps 58 and 60, the output power can be adjusted accordingly using feedback from power detector 44.

The received TPC command may cause device 10 to enter transition zone TZ (FIG. 4). As described in connection with FIG. 4, in zone TZ, device 10 may produce output powers Pout that lie on appropriate transitional output power curves such as curves CT1, CT2, and CT3 (corresponding to operating frequencies fa, fb, and fc in the FIG. 4 example). During the operations of step 66, control circuitry 52 uses known power offset information (e.g., power offset DP at transition zone boundary Pa when operating at frequency fc in the FIG. 4 example) and the known value of the range of TZ (i.e., Pb-Pa) to adjust the requested power Pr as needed to ensure that the output power follows the correct transition zone output power curve. As indicated by line 68, control can then loop back to steps 58 and 60, so that feedback from power detector 44 can be used to maintain the output power at the requested power (as adjusted at step 66).

If a TPC command is received that directs device 10 to operate in open-loop regime OL, the operations of FIG. 6 may be used to control device 10.

As shown in FIG. 6, control circuitry 52 can use the known value of the requested output power Pr and known information on the characteristics of transceiver circuitry 24 and power amplifier circuitry 32 to produce an appropriate output power level Pout at step 70. During the operations of step 70, no power detector signals from power detector 44 need be used. Rather, device 10 can use stored information (e.g., calibration information stored in a look-up table or other suitable data on the characteristics of transceiver circuitry 24 and power amplifier circuitry 32) to adjust the control signals on paths 54 and 34. There is no feedback in regime OL, but because the power levels in regime OL are significantly lower than in regime CL, there is no risk of exceeding regulatory limits on emitted radiation, even if there is a power offset between the requested power and output power.

If network equipment 22 (FIG. 1) issues a TPC command, device 10 may receive this command at step 72 and may update the requested power value Pr accordingly. As indicated by line 74, processing may then continue at step 70. Control moves to step 58 of FIG. 5 if the requested power lies within regime CL.

In the example of FIGS. 4, 5, and 6, the output power control operations associated with transition zone TZ involved the use of feedback (i.e., transition zone TZ may be considered to be part of closed-loop regime CL). If desired, a control scheme for device 10 may be used in which operations in transition zone TZ involve modified open-loop control techniques (i.e., transition zone TZ may be considered to be part of open-loop regime OL). This type of arrangement is shown in FIGS. 7, 8, and 9.

Figure 7:
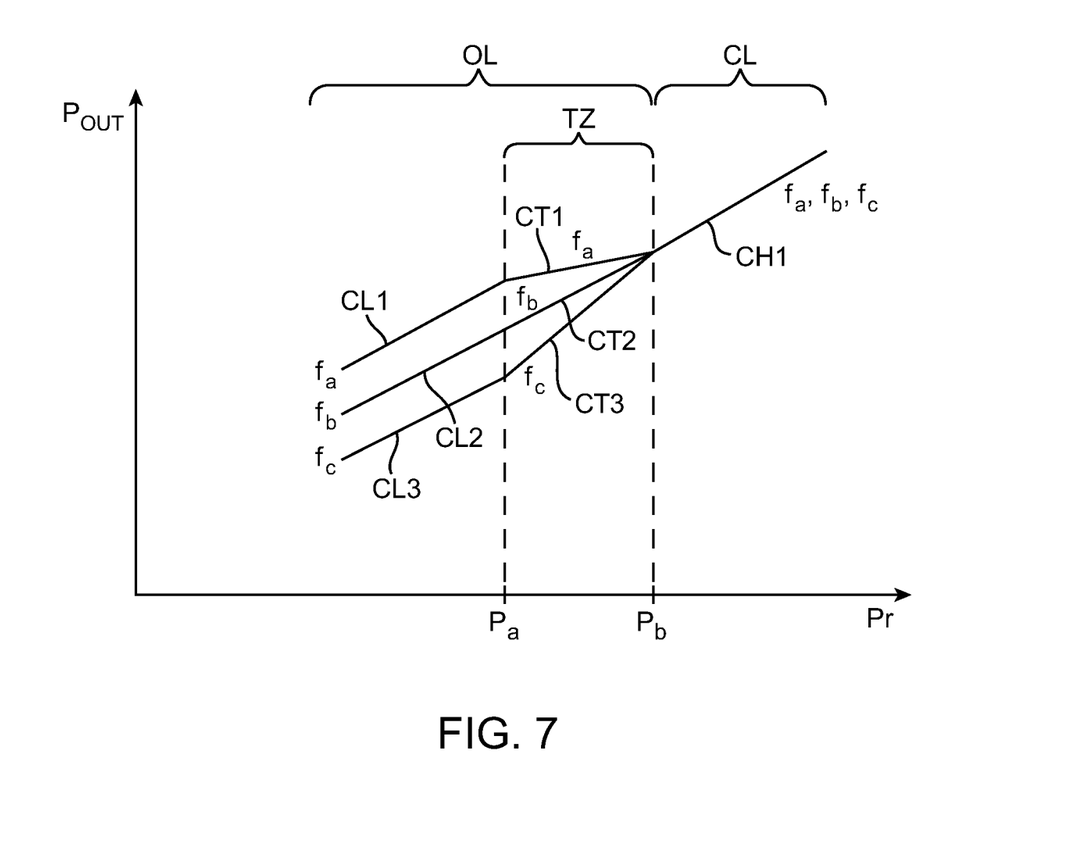
FIG. 7 is a graph showing another set of illustrative radio-frequency output power control curves including linear transition zone curve segments for wireless circuitry in a portable electronic device in accordance with an embodiment of the present invention.

As shown in FIG. 7, output power Pout may be produced by device 10 in an open-loop regime OL at low powers (i.e., powers below power Pb) and may be produced by device 10 in a closed-loop regime CL at high powers (i.e., powers above power Pb). Control circuitry 52 can use the operations of FIG. 8 when controlling the output power Pout in regime OL and can use the operations of FIG. 9 when controlling the output power Pout in regime CL.

Figure 8:
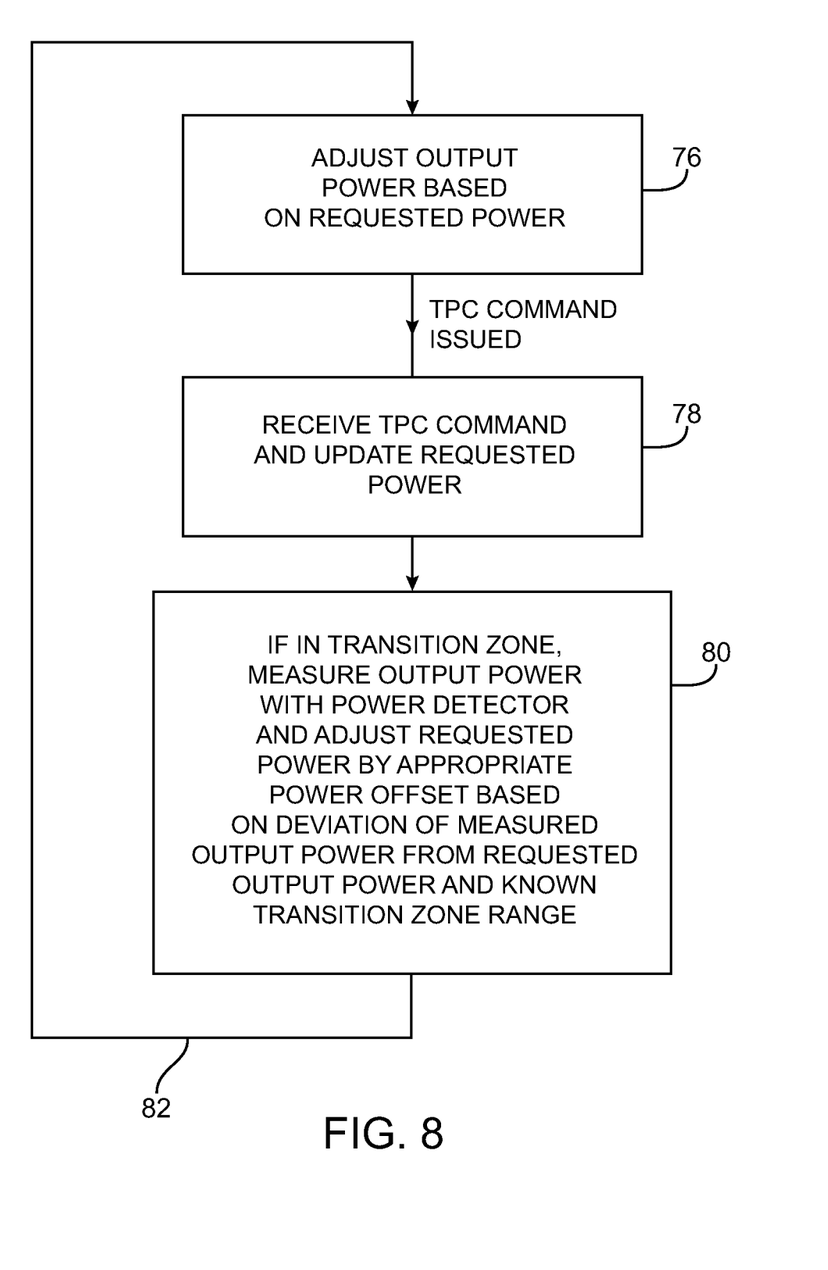
FIG. 8 is a flow chart of illustrative steps that may be used in implementing a radio-frequency output power control scheme of the type shown in FIG. 7 during open-loop operations in accordance with an embodiment of the present invention.
Figure 9:
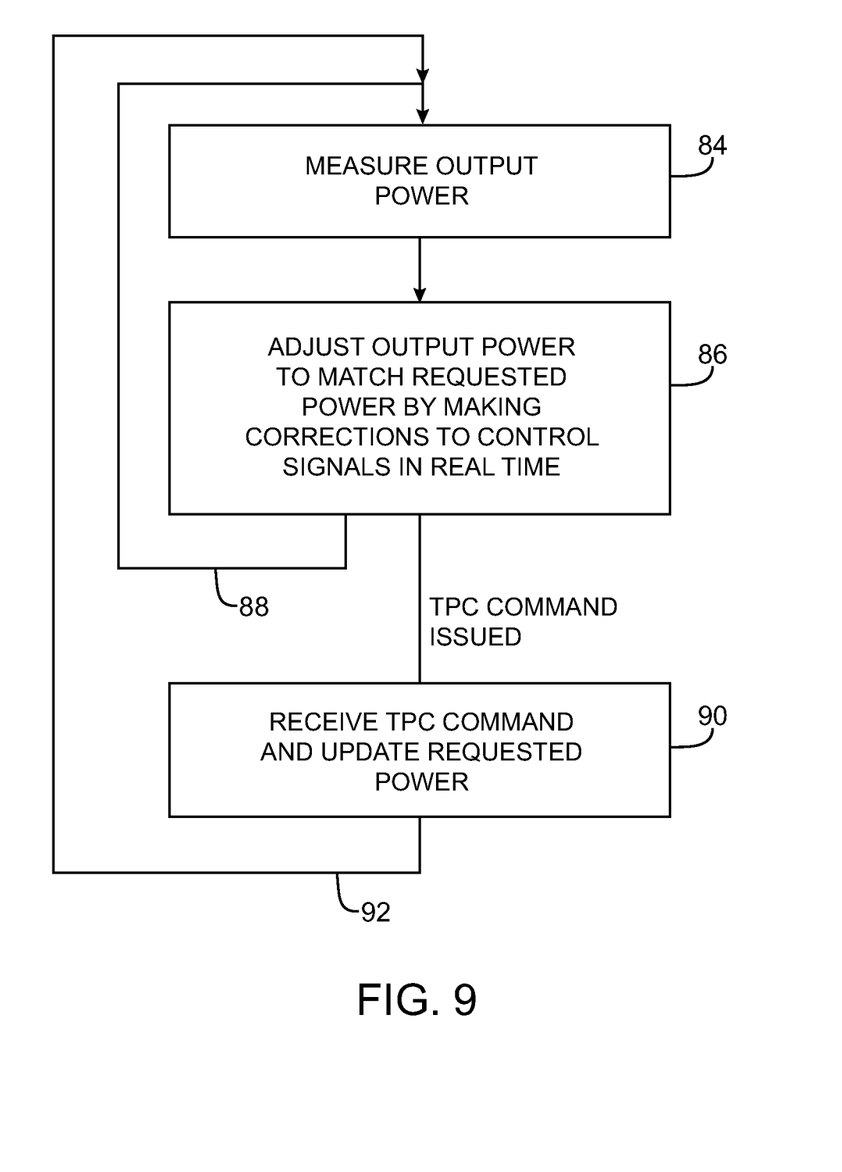
FIG. 9 is a flow chart of illustrative steps that may be used in implementing a radio-frequency output power control scheme of the type shown in FIG. 7 during closed-loop operations in accordance with an embodiment of the present invention.

As shown in FIG. 8, at step 76, control circuitry 52 can adjust the control signals on paths 54 and 34 to adjust the value of Pout based on the current value of requested power Pr (i.e., using open-loop control). Depending on the frequency of operation for device 10, the resulting output power Pout may fall on one of the power output curves in the portion of regime OL below power Pa (i.e., curve CL1, CL2, or CL3, as an example).

Network equipment 22 may issue a TPC command that directs device 10 to increase or decrease the magnitude of its transmitted radio-frequency output power Pout.

At step 78, device 10 may receive and process the transmitted TPC command, updating the value of requested power Pr accordingly.

At step 80, control circuitry 52 may measure the current actual output power Pout using power detector 44. This measurement may be used to calculate the offset between the requested power Pr and the actual output power Pout. Due to the nature of open-loop control schemes, it is typically expected that there will often be a discrepancy (power offset) between the value of Pr and the value of Pout during open-loop control. By measuring the amount of the power offset, by knowing the size of the transition zone (i.e., Pb-Pa in the FIG. 7 example), and by knowing the values of the control signals being provided on paths 54 and 34, control circuitry 52 may, when device 10 is in transition zone TZ, update the requested power value Pr as needed to ensure that the output power Pout will fall on the appropriate transition zone output power control curve (i.e., CT1, CT2, or CT3).

As indicated by line 82, control may then loop back to step 76, so that additional adjustments to the output power can be made if needed.

If a TPC command is received that directs device 10 to operate at a power associated with closed-loop regime CL, the output power from device 10 can be produced using the control operations of FIG. 9. The operations of FIG. 9 correspond to line segment CH1 in FIG. 7.

At step 84 of FIG. 9, control circuitry 52 may use power detector 44 to measure the current output power Pout. At step 86, control circuitry 52 may compare the value of the current output power Pout to the current value of requested power Pr. If there is a discrepancy between these values, control circuitry 52 may adjust the control signals on paths 54 and 34 at step 86 accordingly to ensure that the current output power Pout matches the requested power Pr.

As shown by line 88, these operations may be performed continuously (e.g., once per few clock cycles, etc.).

If network 22 issues a TPC command that directs device 10 to adjust its output power, device 10 may receive the TPC command and may update the value of Pr appropriately at step 90. As indicated by line 92, processing may then loop back to step 84.

Figure 10:
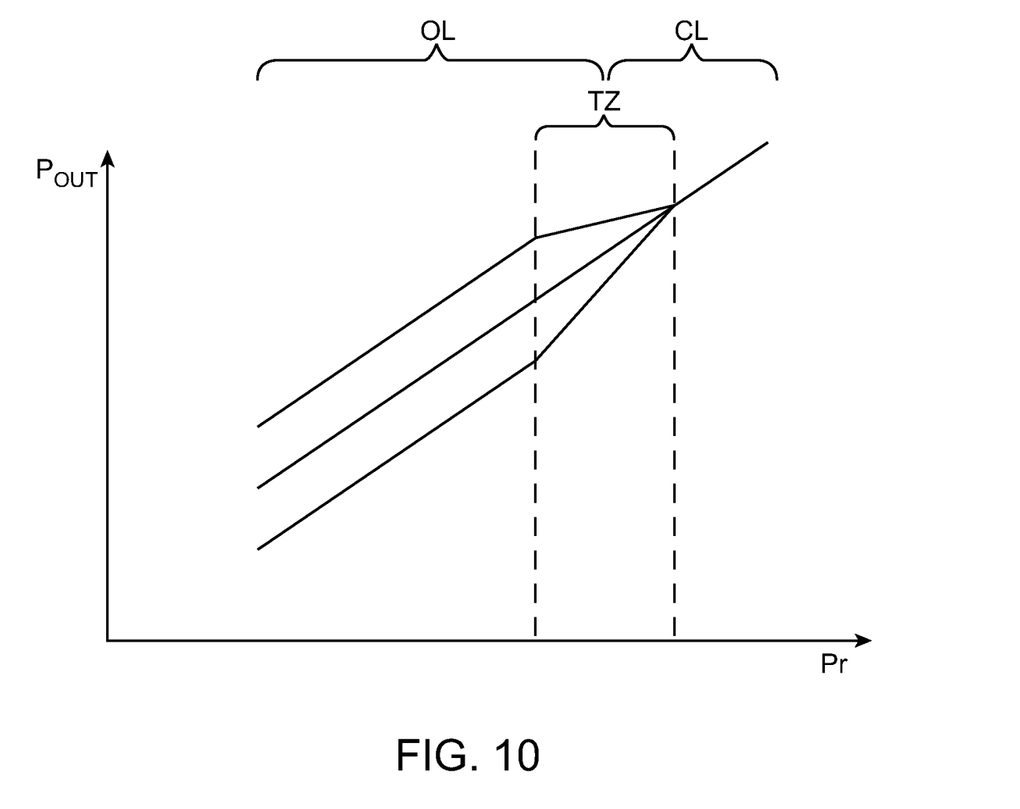
FIG. 10 is a graph of further illustrative radio-frequency output power control curves with smooth monotonically varying transition zone curve segments for wireless circuitry in a portable electronic device in accordance with an embodiment of the present invention.

If desired, a combination of open-loop and closed-loop control schemes may be used to implement the smooth transition of transition zone TZ. This type of arrangement is illustrated in FIG. 10. As shown in FIG. 10, with a blended control scheme of this type, transition control output curves such as curves CT1, CT2, and CT3 may be located partly in open-loop regime OL and partly in closed-loop regime CL.

The foregoing is merely illustrative of the principles of this invention and various modifications can be made by those skilled in the art without departing from the scope and spirit of the invention.

What is claimed is:

1. Wireless communications circuitry on a portable electronic device, comprising:
    antenna structures;
    radio-frequency transceiver circuitry and radio-frequency power amplifier circuitry that transmit wireless radio-frequency signals through the antenna structures at an output power;
    a power detector that produces measurements of the output power; and
    control circuitry that controls the radio-frequency transceiver and power amplifier circuitry to adjust the output power, wherein the control circuitry is configured to operate in an open-loop regime in which the output power is adjusted without using the measurements of the output power, in a transition zone in which open-loop adjustments by the control circuitry are modified based on the measurements of the output power, and in a closed-loop regime, wherein the radio-frequency transceiver circuitry and radio-frequency power amplifier circuitry are configured to transmit the wireless radio-frequency signals in a given frequency band in the closed-loop regime, the open-loop regime, and the transition zone, wherein the given frequency band is selectable from a plurality of frequency bands, wherein, in the open-loop regime and in the transition zone, the output power for a given requested power is different for each frequency band in the plurality of frequency bands, and wherein in the closed-loop regime, the output power for a given requested power is the same for each frequency band in the plurality of frequency bands.

2. The wireless communications circuitry defined in claim 1 further comprising a radio-frequency signal path between the radio-frequency power amplifier circuitry and the antenna structures, the wireless communications circuitry further comprising a tap interposed in the radio-frequency signal path, wherein the tap is coupled to the power detector.

3. The wireless communications circuitry defined in claim 1 wherein the plurality of frequency bands comprise cellular telephone communications bands.

4. The wireless communications circuitry defined in claim 1 wherein the power detector comprises a power sensor that measures the output power and an analog-to-digital converter that digitizes signals from the power sensor and produces corresponding digital signals for the control circuitry and wherein the control circuitry is coupled to the radio-frequency transceiver circuitry and the power amplifier circuitry by control paths over which the control circuitry provides control commands to adjust the output power.

5. The wireless communications circuitry defined in claim 4 wherein the control circuitry is configured to operate in the closed-loop regime when not operating in the open-loop regime and wherein the control circuitry is configured to adjust the output power to match a requested power based on power measurements signals received in real time from the power sensor and the analog-to-digital converter when operating in the closed-loop regime.

6. The wireless communications circuitry defined in claim 1 wherein the antenna structures, radio-frequency transceiver circuitry, and control circuitry are configured to receive transmit power commands that direct the control circuitry to make adjustments to the output power.

7. Wireless communications circuitry on a portable electronic device, comprising:
antenna structures;
radio-frequency transceiver circuitry and radio-frequency power amplifier circuitry that transmit wireless radio-frequency signals through the antenna structures at an output power;
a power detector that produces measurements of the output power; and
control circuitry that controls the radio-frequency transceiver and power amplifier circuitry to adjust the output power, wherein the control circuitry is configured to operate in a transition zone between a closed-loop operating regime and an open-loop operating regime, wherein the control circuitry is configured to make adjustments to the output power in the transition zone that are based on real time measurements of the output power from the power detector and power offset information reflecting how much the output power differs from corresponding requested powers during open-loop operation of the control circuitry in which the output power is adjusted by the control circuitry without using the measurements of the output power, wherein the radio-frequency transceiver circuitry and radio-frequency power amplifier circuitry are configured to transmit the wireless radio-frequency signals in a given frequency band in the open-loop regime, in the closed-loop regime, and in the transition zone, wherein the given frequency band is selectable from a plurality of radio-frequency bands, and wherein the power offset information is specific to each frequency band in the plurality of radio-frequency bands, wherein, in the open-loop regime and in the transition zone, the output power for a given requested power is different for each frequency band in the plurality of frequency bands, and wherein in the closed-loop regime, the output power for a given requested power is the same for each frequency band in the plurality of frequency bands.

8. The wireless communications circuitry defined in claim 7 wherein the control circuitry is configured to make adjustments to the output power when operating in an open-loop control regime in which the measurements from the power detector are not used as feedback signals.

9. The wireless communications circuitry defined in claim 8 wherein the control circuitry is configured to adjust open-loop control adjustments that are made to the output power based on power offset information that is determined based on the measurements of the output power.

10. The wireless communications circuitry defined in claim 7 further comprising a radio-frequency signal path between the radio-frequency power amplifier circuitry and the antenna structures, the wireless communications circuitry further comprising a tap interposed in the radio-frequency signal path, wherein the tap is coupled to the power detector.

11. The wireless communications circuitry defined in claim 10 wherein the frequency bands comprise cellular telephone communications bands.

12. The wireless communications circuitry defined in claim 7 wherein the frequency bands comprise cellular telephone communications bands.

13. A method for using a radio-frequency power detector and control circuitry to control radio-frequency transceiver circuitry and radio-frequency power amplifier circuitry in a portable electronic device, comprising:
with the radio-frequency transceiver circuitry and the radio-frequency power amplifier circuitry, transmitting wireless radio-frequency signals at an output power;
with the radio-frequency power detector, producing measurements of the radio-frequency output power; and
operating the control circuitry to control the radio-frequency transceiver circuitry and the radio-frequency power amplifier circuitry to adjust the output power, wherein operating the control circuitry includes:
transmitting the wireless radio-frequency signals in a given frequency band in an open-loop control regime in which the control circuitry adjusts the output power based on a requested power value without using the measurements of the radio-frequency output power;
transmitting the wireless radio-frequency signals in the given frequency band in a closed-loop control regime in which the measurements of the radio-frequency output power are used as feedback signals so that the output power is adjusted to match the requested power value;
in a transition zone between the open-loop control regime and the closed-loop control regime that has an associated transition zone size, transitioning between the open-loop control regime and the closed-loop control regime using information on the transition zone size; and
transmitting the wireless radio-frequency signals in the given frequency band in the transition zone, wherein the given frequency band is selectable from a plurality of frequency bands, wherein, in the open-loop regime and in the transition zone, the output power for a given requested power is different for each frequency band in the plurality of frequency bands, and wherein in the closed-loop regime, the output power for a given requested power is the same for each frequency band in the plurality of frequency bands.

14. The method defined in claim 13 further comprising:
receiving a transmit power control command from cellular telephone network equipment, wherein transitioning between the open-loop control regime and the closed-loop control regime comprises adjusting the output power in response to the received transmit power control command.

15. The method defined in claim 13 wherein transitioning comprises:
using modified open-loop control operations in which the control circuitry updates requested powers for open-loop output power adjustments based on power offset information.

16. The method defined in claim 15 further comprising:
determining the power offset information using the measurements of the radio-frequency output power.

17. The method defined in claim 13 wherein transitioning comprises:
using modified closed-loop control operations in which the control circuitry updates the requested power value based on power offset information and matches the output power to the updated requested power value using real time feedback of the measurements of the radio-frequency output power from the power detector.

18. The method defined in claim 13 further comprising:
digitizing power measurement data for the power measurements using an analog-to-digital converter associated with the power detector; and
providing the digitized power measurement data to the control circuitry.

19. A handheld electronic device, comprising:
an antenna;
wireless circuitry that transmits radio-frequency signals through the antenna at an output power;
a power detector that produces power measurements of the output power; and
control circuitry that is configured to make output power adjustments on the transmitted radio-frequency signals so that the wireless circuitry operates in:
an open-loop control regime in which the output power is controlled by the control circuitry without using the power measurements;
a closed-loop control regime in which the output power is controlled using the power measurements as real time feedback; and
a transition zone in which the output power is linearly varied to transition between the output power produced in the closed-loop control regime and the output power produced in the open-loop control regime, wherein the wireless circuitry is configured to transmit the radio-frequency signals in a given frequency band in the open-loop control regime, in the closed-loop control regime, and in the transition zone, wherein the given frequency band is selectable from a plurality of frequency bands, wherein, in the open-loop regime and in the transition zone, the output power for a given requested power is different for each frequency band in the plurality of frequency bands, and wherein in the closed-loop regime the output power matches the given requested power for each frequency band in the plurality of frequency bands.

20. The handheld electronic device defined in claim 19 wherein the wireless circuitry is configured to operate in cellular telephone communications bands and wherein the control circuitry is configured to use the power measurements in determining how to linearly vary the output power in the transition zone.

21. The handheld electronic device defined in claim 20 wherein the transition zone has a transition zone size and wherein the wireless circuitry is configured to use the transition zone size in determining how to linearly vary the output power in the transition zone.

* * * * *